May 23, 1933.  C. L. EKSERGIAN ET AL  1,910,384
PREPRESSING MACHINE
Filed Oct. 30, 1929   2 Sheets-Sheet 1
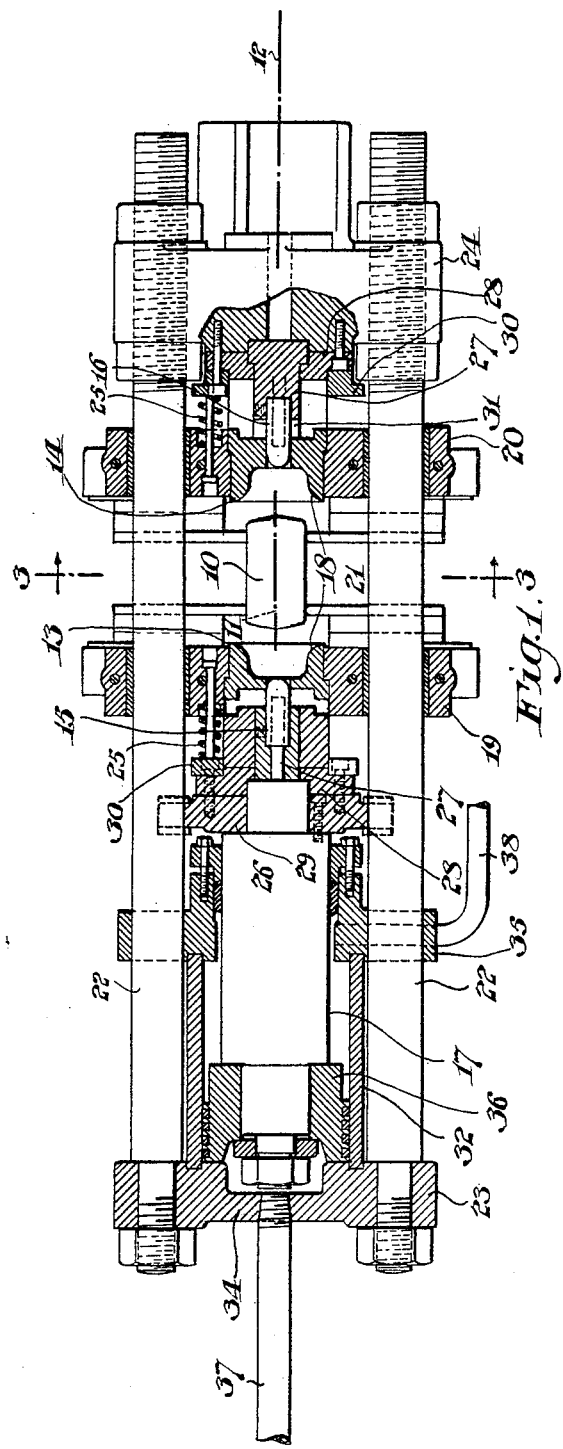
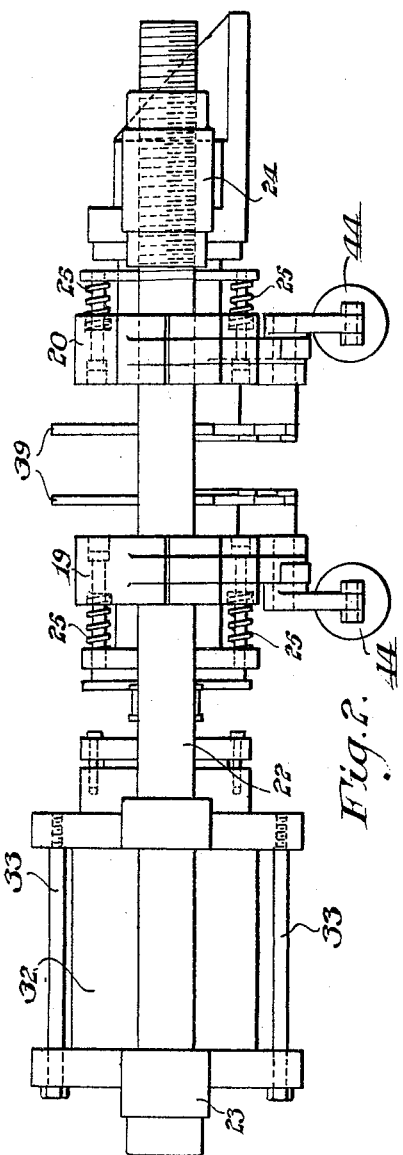
INVENTOR.
Carolus L. Eksergian
and William A. Weightman,
By John P. Tarbox
ATTORNEY.

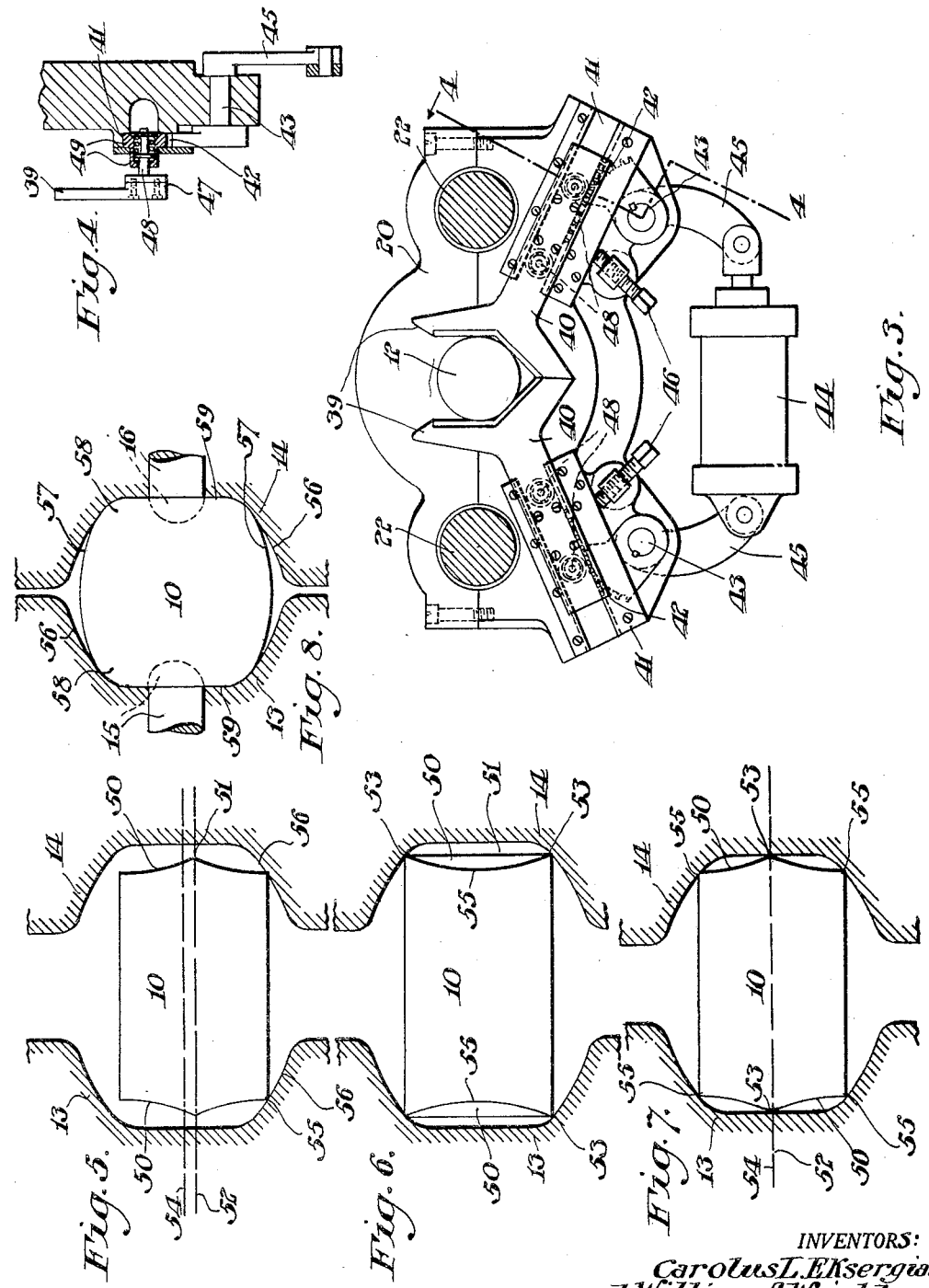

Patented May 23, 1933

1,910,384

UNITED STATES PATENT OFFICE

CAROLUS L. EKSERGIAN, OF DETROIT, MICHIGAN, AND WILLIAM A. WEIGHTMAN, OF PHILADELPHIA, PENNSYLVANIA, ASSIGNORS TO BUDD WHEEL COMPANY, OF PHILADELPHIA, PENNSYLVANIA, A CORPORATION OF PENNSYLVANIA

PREPRESSING MACHINE

Application filed October 30, 1929. Serial No. 403,402.

The billet centering pre-press of my invention comprises final center dies of cup form engaging the peripheries of the ends of the billet, having an initial advance movement of an unyielding character, temporary center dies engaging the billet ends within the periphery, and having a punch form on the axis of the billet, together with a common operating motor for said temporary and final dies. In detail, the final center dies of cup form having flaring lips, and in the final advance movement conjoin with the temporary center dies to form the entire ends of the billet and the peripheries of those ends in a manner to be received by the billet fabricating machine such, for example, as a rolling mill or an upsetting machine. In combination with the temporary and final dies is a work rest centering the billet with respect to the dies, until after their relative approach has resulted in engagement of the billets by the final center dies, and thereafter retractable. This work rest is preferably radially retractable but may be retractable in other ways.

A pre-press so constituted is of a special value in connection with the shaping of the ends of billets of very heavy character, such as those cut from bar stock several inches in diameter, and a number of inches long, and utilized in the fabrication of hubs, hubs and drums, wheel discs, etc., for automobile wheels.

A machine for this purpose has been a primary object of my invention. It is of prime importance in this work that the ends of the billet be given such end formation as to enable it to be first retained on the axis of the fabricating machine while the dies or other working elements of the machine are separated from each other, and dis-engaged from the work piece itself, that it be accurately centered on the axis so that the various operations of fabrication may be commenced with precision, that it be readily so centered and held on the axis as well as securely so that the operation of feeding the fabricating machine may be the more rapidly and efficiently carried out, that the initial centering which may be termed temporary in some cases at least, be accurately transferred to the working dies or other elements of the machine themselves so soon as such dies or elements actually begin their major work of fabrication, and that this final centering in the working dies themselves be of such powerful character that work upon the piece may proceed under the great power required without disturbing the accuracy of the centering.

From the standpoint of the pre-pressing operation itself, it is required that the least amount of work practicable be done on the billet before the actual work of fabrication of the article formed and that this work be efficiently done. This and the foregoing ends are all attained by the press of my invention as above described, and as constructed in detail according to the accompanying drawings.

These drawings in Fig. 1 show such a pre-press in central longitudinal section,

Fig. 2 in side elevation, and in

Fig. 3 in transverse cross section on line 3—3 of Fig. 1.

Fig. 4 is a section approximately on line 4—4 looking in the direction of the arrows showing the detail of mounting of the work press.

Figs. 5 to 8 are diagrammatic illustrations of the action of the pre-pressing dies upon the billet.

Figs. 5, 7 and 8 are in plan and Fig. 6 in elevation of the billet.

There are two sets of dies used in the pre-press of our invention, one which indents axial centering sockets in the ends of the billet and another which contours the ends and side walls of the billet. Inasmuch as the axial sockets are used preliminarily and temporarily in the obtuse angle rolling mill to initially center the work in the mill, they are termed by us temporary centering dies. Inasmuch as the dies which form the ends and the side walls of the billet to contour give it those more expansive end formations which are used to take over from the sockets and maintain the centering operation during the obtuse angle rolling, they will be termed by us final centering dies.

The billet 10 as cut from hot bar stock and still retaining its heat is shown in Fig. 1 in the machine. The axis 11 of the billet lies on the axis 12 of the machine. Also, on this axis are the final centering dies 13 and 14 of cup form and the temporary centering dies 15 and 16 of punch form, as well as the common operating motor 17.

The cup form centering dies 13 and 14 are in general interiorly of a cross section that desired to be given to the periphery and to the outer portions of the ends of the billet. Their lips as indicated at 18 have the flare described. These dies are slidably mounted in the centers of a pair of cross heads 19 and 20 in which they have a relative movement limited by shoulders 21. Cross heads 19 and 20 slide on longitudinally extending symmetrically arranged parallel bars 22 which rigidly interconnect the fixed frame heads 23 and 24 of the press.

The cross heads 19 and 20 have a plurality of yielding connections 25 between them and the respective members 29 and 24 on each side of the work. These connections are in the form of springs on the axes of retaining bolts connected with the members 29 and 24 and having a limiting lost motion connection with the cross heads. The bolts are connected directly with the frame member in the case of the cross head 20, but intervened between the bolts and springs in the case of the cross head 19 is a motor 17 and its parts.

The temporary centering dies 15 and 16 of punch form are projected through the centers of the final centering dies 13 and 14. That die 16 in association with the final die 14 is mounted upon the adjacent frame member 24. That die 15 in connection with the die 13 is mounted upon the adjacent end of the piston rod 26 of the motor 17. Mounting in each case is through the intermediary of the shank 27 having an enlarged head, and a bolting-on plate 28 which clamps the enlarged head against the member on which the die is mounted. In the case of the motor mounted die 15, the bolting-on plate 28 connects to motor cross head 29 having gibs sliding on bars 22, and being itself bolted to the enlarged main body of the piston 26. It is to this cross head 29 that the yielding means 25 operating the cross head 19 connects through the plate 28. The yielding devices 25, however, have common connection to intermediate securing rings 30. The dies 15 and 16 are individually removable from their shanks 27. They are water cooled through passageways indicated in dotted lines 31.

The motor means 17 comprises the cylinder proper 32 clamped between heads at its opposite ends, by means of bolts 33. The one head 34 is constituted by the frame member 23 itself. The other, 35, is constituted by a separate part mounted on the bars 22. The enlarged main body of piston rod 26 passes through a stuffing box in this latter head. On its inner end it connects with the piston 36. The power for the retracting stroke is supplied through conduit 38 to the inside of the piston where its effective area is reduced by the enlarged piston rod 26.

The temporary work rests are designated 39 as clearly appears in the figures, particularly in Figs. 1 and 2. There are two of these work rests. Each of them, as seen in Fig. 3, consists of two Y-shaped members 40, the shanks of which are carried in guides 41 on the adjacent cross heads 19 or 20. The shanks are reciprocable in the guideways by means of rack and segment connections 42 to oscillating shaft 43 having a crank connection 45 for oscillation by fluid pressure motor 44. Stops 46 in extension of cranks 45 bear against the guides 41 and limit the degree of approach movement of the Y's 40 toward each other, thereby to adapt the rests to work of different diameter. The geometrical relations of parts is such that while the axes of the shanks of the Y's 40 intersect the axis 12 of the machine and bisect the angle of the forks of the Y's, the upper arms of the forks are parallel to each other and to the plane of symmetry of the machine. Thereby work may be inserted from above between the parallel upper arms of the fork and come to rest temporarily supported and preliminarily centered on the axis 12 of the machine by all branches of the forks of the Y's.

As clearly appears from Figs. 3 and 4, the trunks 47 of the Y shaped members 40 are comprised of parallel branches the outer of which is connected to the inner by pins 48 having a yielding connection with the inner through springs 49 housed in sockets in the inner member in such manner as to yieldingly hold the inner and outer parts 47 apart and the rests 39 outwardly of the heads 19 and 20.

In operation, the billet is lowered by tongs or conveyor upon the rests 39 when they occupy their positions of approach toward each other as indicated in Fig. 3. At this time all dies are receded from each other, the parts being in the position shown in Fig. 1. Fluid applied to the motor for the working stroke to conduit 37, the final dies 13 and 14 of cup form engage over the ends of the work piece 10 as supported by work rests 39 with its axis 11 on the axis 12 of the machine. They engage the outer peripheries of these ends concentrically with the axis 11. The die 13 connected with the motor 17 is, of course, the first die to engage, and it carries the work piece 10 over into and engages it with the opposed final die 14 of cup form. These dies upon engagement take over the centering of the piece from the work rest 39. The resistance of the work piece 10 forces the yieldingly mounted final dies 13 and 14 backwardly against the pressure of the yielding means 25 taking up the lost motion between them in the process, and quickly brings these dies 13 and 14 up against the ends of the shanks 27 which mount the temporary dies 15 and 16. The engagement then becomes an unyielding engagement.

The work piece is now forced home under the high pressure of the motor 17 into the unyielding final dies 13 and 14, which have taken over the centering from the work rests 39, and simultaneously its ends are forced over the now protruding ends of the temporary centering dies 15 and 16 of punch form. These latter dies 15 and 16 upon first engagement of the work piece 10 by the final dies 13 and 14 occupy the relative positions shown in Fig. 1 in which they do not project within the bottoms of the cup forms of dies 13, 14. This admits a full and powerful centering action by these cup formed dies as it takes the work from the rest 39, and secures a continuing of such powerful centering action during the early stages of the movement of the temporary centering dies 15 and 16. This action accomplishes a very desirable end in that the ends of work pieces 10 as cut from bar stock are angular in form and liable to displacement under the centering forces unless the work piece be thus strongly held by the dies 13 and 14. The final stages of the push-up of the motor 17, however, bring the dies 13 and 14 of cup form into action as final forming dies for the ends of the peripheries of the ends of the billet 10, under the joint action of direct pressure of these dies and the indirect pressure brought about by the metal displaced by the punching dies 15 and 16. At the last stage so great pressure is brought to bear and so great an amount of metal displaced that the billet is bulged outwardly in its intermediate portions as indicated in Fig. 8, which depicts the final product. Rests 39 being out of the way do not interfere with the action. The longitudinal dimension of the billet is determined by the reaching of the piston 36 to the bottom of its stroke. Adjustment of this dimension may, of course, be had by adjusting the distance between the heads 23 and 24 of the machine.

Upon completion of this stroke pressure is cut off from conduit 37 and is cut on to conduit 38 retracting the piston 36 and again separating the dies from each other, whereupon the work piece 10 is dropped from the final dies 13, 14 upon the now retracted work rests 39, the branches of the Y's of which are sufficiently spread apart to receive it.

The action of the work rest is manifold. The bulge of the billet 10 to the form of Fig. 8 spreads the work rests 39 radially apart re-acting against a moderate maintained pressure in the cylinders 44 insufficient to interfere with radial metal flow of the billet. Axial approach of heads 19 and 20 toward each other carries axially opposed work rests 39 toward each other. The yielding mounting 49 of these work rests permits them to yield before any axial irregularities of the billet. Still further, toward the end of the pre-pressing movement, the work rests 39 may actually contact with each other about the girth of the billet and yield to each other to the extent of movement permitted by the yielding connection 48—49, (Fig. 4). So yielding radially and axially, they not only maintain the blank in centered position before the billet is first distorted by the pre-pressing operation, not only accommodate themselves to the pre-press formation of the billet, but also are ready at the termination of the operation to receive the pre-pressed billet in its final form.

Moreover, the work rests are susceptible of use in various ways. The actuating cylinders 44 may be operated, if desired, before the final approach movement of the final dies 13 and 14 to retract them from the path of movement of the die, whereby the dies themselves may be approached more closely to each other, and upon separation of the dies after completion of the product, again radially approached to receive the completed billet as it drops from the dies. So too, such operation may be rendered automatic if desired by appropriate connection to the moving elements of the pre-press.

Figs. 5 to 8 show more exactly, and on a larger scale, the cross section of the dies 13 and 14 and the form of a billet operated upon. The billet 10, as it is cut off from the hot bar stock by diametrically opposed knives, has formed on its ends diametrically opposed facets 50 shown in side elevation in Fig. 6 and in plan in Figs. 5 and 7. These facets meet in the final cut-off line 51 which lies on the center line of the billet and define a vertical plane through the center line. The length of the billet between lines 51 is its greatest length and the ends 53 of the lines 51 are first to be engaged by the dies 13 and 14, other points of the facets 50 being axially nearer together, unless it may be, as illustrated in Fig. 5, the center line 52 of the billet 10 as placed in the pre-press, is laterally displaced from the center line 54 of the dies themselves, in which event the dies also engage at points 55 on the side of the billet as shown in Fig. 5. In any event, as the dies are approached toward each other while initial engagement may be only at the points 53, soon after engagement does take place on one or the other side at right angles to the lines 51 at points such as 55. If the billet center line 52 lies away from the pre-press center line 54, progress of dies 13 and 14 toward each other through the inclined side walls 56 forces billet 10 laterally until its axis 52 coincides with the axis 54 as indicated in Fig. 7, whereupon the dies engage at a number of points 55 symmetrically with respect to both billet 10 and dies 13 and 14. In this process, however, the points 53 are flattened somewhat by the pressure of the dies, otherwise the dies cannot continue to approach each other and center the billet between them. If, due to accurate billet diameters and accurate work rests 39, the axis 52 of the billet should lie precisely on the axis 54 of the dies, initial engagement of all points 55 would take place simultaneously, but the points 53 would be flattened in the process in the same manner. But with or without work rests 39, the action of the dies 13 and 14 is the same, the inclined and outwardly divergent side walls 56 as the dies approach each other, first engaging at least the points 51, and perhaps also the points 55 on diameters at right angles thereto and thereafter, if axes 52 and 54 are non-coincident, moving the billet laterally to coincide them and accurately center the billet.

Configuration of the cross section 13—14 of the dies is very important. Not only are the angles of divergence of the side walls 56 chosen with a view to forcing coincidence of axes 52 and 54 efficiently from a standpoint of maximum of celerity, accuracy and minimum force, but they are also chosen with a view to so forming the ends of the billet under final pre-press pressure as to avoid cold cracks. Thus, as clearly appears in Fig. 8 which illustrates the dies and billet in the final stage of pre-pressing, the side walls 56 have an angle of divergence greater than the final angle of divergence of the bulged side walls 57 of the pre-pressed billet. The side walls 56 free from the main body of the sides of the billet are tangential to the corner portions 58. These corner portions are well rounded and merge smoothly into the side portions 57 without re-entrance of any kind. The bottoms of the dies 59 are flat though they may be slightly concave thereby continuing the generally concave contour of the sides and corners of the billet over the end surfaces thereby making it ball-like in character. With such contours the metal of the billet is flowed, generally radially outward without axial constriction which can in any manner result in such irregularities of flow or such overlapping of mass on mass as will create cold cracks or give rise to cold cracks in subsequent operations.

Punching dies 15 and 16 have an end contour of ball-like character and as they enter the mass of the metal to the extreme extent shown in Fig. 8, and coact with the generally concave and divergent side walls 56 of the dies 13 and 14 to further the general radial mass movement of the metal of the billet without incipient cold cracks. The ends of the dies 15 and 16 are substantially hemispherical.

The pre-pressed billet so formed lends itself to obtuse angled rolling under the highest efficiency and the greatest freedom from irregularities.

The scope of my invention is the purview of its generic spirit as determined by the foregoing specification and the prior art rather than the circumstantial terminology of the annexed claims.

What we claim is:

1. A billet forming and centering pre-press comprising cup-shaped final center dies engaging the billet periphery on its ends, temporary center dies engaging the ends of the billet for forming centering means within the periphery, a common operating motor for the two sets of dies and lost motion operating connections between said two sets of dies to permit said dies to engage the billet successively.

2. A billet forming and centering pre-press comprising cup-shaped final center dies engaging the billet periphery on its peripheral end edges, temporary center dies engaging the ends of the billet for forming centering means within the periphery, said dies having a common longitudinal axis, and lost motion operating connections between said two sets of dies to permit said dies to engage the billet successively, together with a common operating motor for said dies.

3. A billet forming and centering pre-press comprising final center dies engaging the billet periphery, temporary center dies engaging the billet within the periphery, and lost motion operating connections between said two sets of dies, together with a common operating motor for said dies, said lost motion operating connections including springs advancing the final center dies axially over the temporary dies.

4. A billet forming and centering pre-press comprising final center dies of cup form engaging the billet ends on their peripheries, temporary center dies of punch form operating through the bodies of said final center dies and engaging the ends of the billet on the axis thereof, and lost motion operating connections between said two sets of dies to permit said dies to engage the billet successively.

5. A billet centering press comprising opposed centering dies, and a yieldable work centering rest, said work rest being expansible toward and from the axis of the work in accordance with the contour of the billet.

6. A billet forming and centering pre-press comprising opposed final center dies engaging the billet on the peripheries of its ends, means for causing said dies to have an initial advance movement of a yielding character and a final advance movement of an unyielding character, temporary center dies movable relative to said final centering dies and engaging the billet ends unyieldingly within the peripheries thereof for forming centering means thereon, whereby the final centering dies yieldingly engage the ends of the billet and, upon the termination of such yielding engagement the billet is subjected to the aforesaid positive and joint action of the temporary and final dies.

7. A billet pre-press comprising a pair of relatively axially reciprocable dies, a work support intermediate said dies for holding the billet during operation of said dies, said work support comprising a pair of oppositely reciprocable complemental work supporting members, and yieldable means for urging the parts of said work support toward each other to permit said support to accommodate changes in shape of said billet during operation of the dies.

In testimony whereof we hereunto affix our signatures.

CAROLUS L. EKSERGIAN.
WILLIAM A. WEIGHTMAN.